July 14, 1925.
A. C. MILLS
VEHICLE SPRING
Filed Oct. 25, 1923
1,546,144
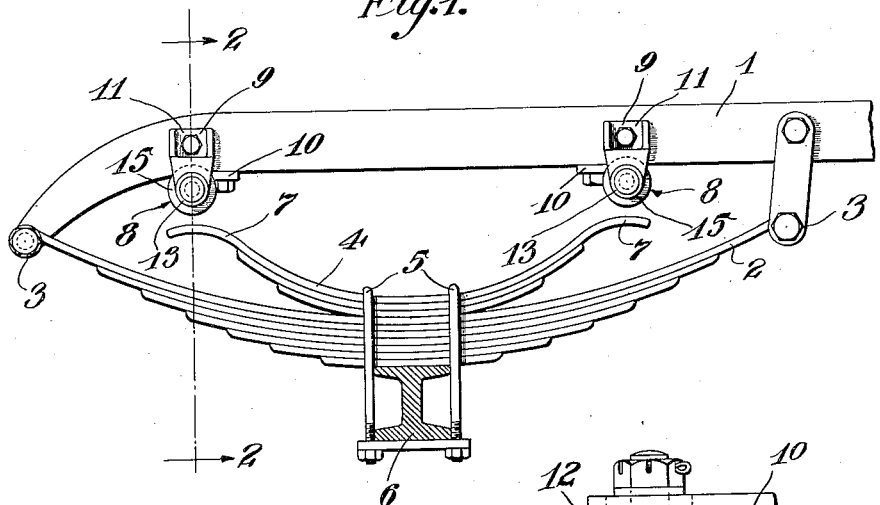
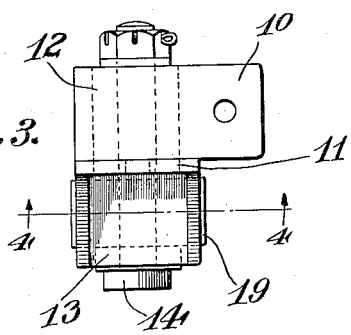
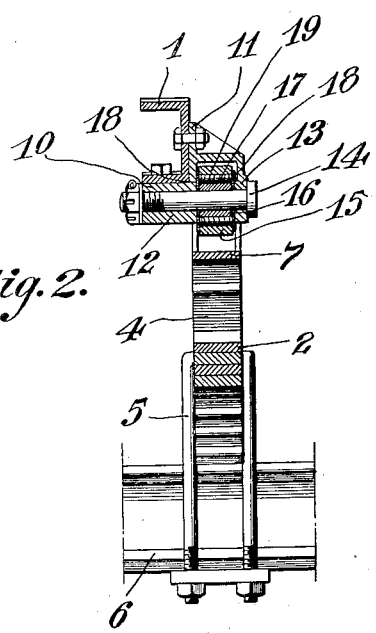
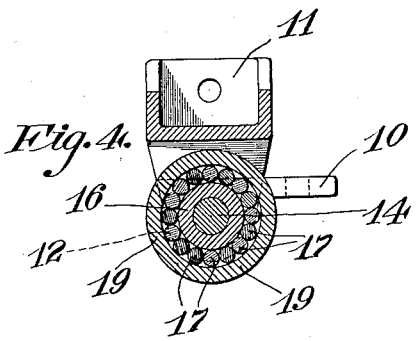
Witnesses:
Virgil L. Mares
George A. Gruss
Inventor
Abner C. Mills
By Joshua R. H. Potts
his Attorney Patented July 14, 1925.

1,546,144

UNITED STATES PATENT OFFICE.

ABNER C. MILLS, OF WILLOW GROVE, PENNSYLVANIA.

VEHICLE SPRING.

Application filed October 25, 1923. Serial No. 670,640.

*To all whom it may concern:*

Be it known that I, ABNER C. MILLS, a citizen of the United States, residing at Willow Grove, in the county of Montgomery and State of Pennsylvania, have invented certain new and useful Improvements in Vehicle Springs, of which the following is a specification.

My invention relates to vehicle springs and more particularly to spring-engaging devices adapted to engage an emergency spring before the main spring is stressed to its load-supporting limit.

The objects are to provide means which will be operative to take the extra load or shock from the main spring when stressed to a point where it is liable to break, and which will be inoperative when the main spring is under ordinary strains.

These objects, and other advantageous ends which will be described hereinafter, I attain in the following manner, reference being had to the accompanying drawing in which—

Figure 1 is a fragmentary side view partly in section of a vehicle having my invention applied thereto, Figure 2 is a section on line 2—2 of Figure 1, Figure 3 a top plan view of the spring-engaging device constructed in accordance with my invention, and Figure 4 a section on line 4—4 of Figure 3.

Referring to the drawings, 1 indicates the chassis of a vehicle, 2 the main spring connected to the chassis at its ends 3. A bowed-emergency spring 4 rests on the main spring and is secured thereto by U-bolts 5 which secure the main spring to the axle 6 in the usual manner. The ends 7 of the emergency spring 4 extend toward the chassis and are adapted to engage anti-friction spring-engaging devices 8, secured to the chassis, when main spring 2 is stressed beyond a certain limit.

These spring-engaging devices are disposed directly above the ends 7 of the emergency spring and are spaced therefrom a sufficient distance to allow the main spring to take the load by itself when not subjected to excessive strain. The construction of each of these devices 8 is indentical and but one will be described.

The spring-engaging device includes a bracket 9 composed of a pad 10 engaging the bottom of the chassis and a pad 11 engaging the side of the chassis. These pads are secured to the chassis by bolts. Each pad 10 and 11 is provided with depending supports 12 and 13 respectively for receiving a journal bolt 14. The supports are suitably reinforced by ribs for strength and rigidity. An anti-friction roller 15 is mounted on bolt 14 between supports 12 and 13 and is composed of a sleeve 16 fixed to bolt 14; rollers 17 mounted to roll on the sleeve; side plates 18 for keeping the rollers in position, and a ring 19 rotatable on the rollers 17.

In use, when the vehicle is loaded or receives a shock from the road so that its main spring is subjected to more than ordinary strain, the ends 7 of the emergency spring will engage the roller 15. As the pressure upon the emergency spring increases, its ends 7 will be forced farther apart and the anti-friction rollers 15 which they engage will allow them to move practically unobstructed, thus smoothly absorbing shocks or taking the extra load off the main spring and thereby preventing it from breaking.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with a main spring connected to a chassis and a bowed emergency spring secured to the main spring with its ends extending toward the chassis; a bracket disposed above each end of the emergency spring, having a pad secured to the bottom of the chassis, and a pad secured to the side of the chassis, each of the pads being provided with a depending roller support; a bolt passing through the supports, and a roller mounted on the bolt between the supports and adapted to be engaged by the end of the emergency spring when the main spring is subjected to strains beyond a certain limit.

2. In combination with a main spring connected to a chassis and a bowed emergency spring secured to the main spring with its ends extending toward the chassis; a bracket disposed above each end of the emergency spring, having a pad secured to the bottom of the chassis and a pad secured to the side of the chassis, each of the pads being provided with a depending roller support; a bolt passing through the supports; a sleeve on the bolt; rollers mounted to roll about the sleeve, and a ring rotatable on the rollers adapted to be engaged by the end of the emergency spring when the main spring is subjected to strains beyond a certain limit.

In testimony whereof I have signed my name to this specification in the presence of two subscribing witnesses.

ABNER C. MILLS.

Witnesses
ANNA M. QUINN,
ELIZABETH GARBE.